| United States Patent [19] | [11] Patent Number: 4,725,466 |
| Crass et al. | [45] Date of Patent: Feb. 16, 1988 |

[54] NON-SEALABLE, BIAXIALLY ORIENTED MULTI-LAYER POLYPROPYLENE FILM

[75] Inventors: Guenther Crass, Taunusstein; Lothar Bothe, Mainz-Gonsenheim, both of Fed. Rep. of Germany

[73] Assignee: Hoechst Aktiengesellschaft, Frankfurt am Main, Fed. Rep. of Germany

[21] Appl. No.: 863,447

[22] Filed: May 15, 1986

[30] Foreign Application Priority Data

May 17, 1985 [DE] Fed. Rep. of Germany ....... 3517795

[51] Int. Cl.⁴ .................... B65D 65/40; B32B 27/32; B32B 31/16
[52] U.S. Cl. .................................. 428/35; 428/215; 428/331; 428/447; 428/448; 428/910; 428/516; 428/354; 264/176.1
[58] Field of Search ................. 428/331, 35, 516, 215, 428/447, 448, 910

[56] References Cited

U.S. PATENT DOCUMENTS 4,348,457  9/1982  Rosenthal et al. .................. 428/349

FOREIGN PATENT DOCUMENTS 0124310  11/1984  European Pat. Off.
0229340  12/1984  Japan .................. 428/331

Primary Examiner—P. C. Ives
Attorney, Agent, or Firm—Schwartz, Jeffery, Schwaab, Mack, Blumenthal & Evans

[57] ABSTRACT

A non-sealable polypropylene multi-layer film comprises a base layer and at least one covering layer, the base layer as wella as the covering layer or layers being formed of propylene homopolymers. The covering layers contain a combination of additives composed of (a) from 0.2 to 1.0% by weight of a long-chain aliphatic amine, (b) from 0.2 to 1.0% by weight of a polydialkylsiloxane, and (c) from 0.1 to 1.0% by weight of a platelet-shaped inorganic pigment, the platelets of the pigments being disposed substantially parallel to the surface of the covering layer. The film is preferably produced by a coextrusion process. It is preferably used as a laminating film, an interleaving film or a metallizable film. The novel non-sealable polypropylene multi-layer film has, in particular, good anti-blocking and slip properties, good optical properties, good antistatic properties, and a high scratch resistance. The film can be subjected to a corona treatment without thereby adversely influencing its properties.

17 Claims, No Drawings

NON-SEALABLE, BIAXIALLY ORIENTED MULTI-LAYER POLYPROPYLENE FILM

BACKGROUND OF THE INVENTION

The present invention relates to a non-sealable, biaxially oriented multi-layer film of propylene polymers, which comprises a base layer and one or two covering layers. The invention also relates to a process for the production of this film and to its use.

The hitherto known non-sealable, biaxially oriented multi-layer films of propylene polymers, formed of a base layer and one or two covering layers (i.e. the base layer which substantially comprises propylene polymers is provided with covering layers on one or both surfaces thereof, which also substantially comprise propylene polymers) have, in particular, the disadvantage that they are unsatisfactory in view of their slip and anti-blocking characteristics, while they simultaneously have good antistatic properties and are highly transparent. In addition, the scratch resistance of these films, which is another important property, is more or less insufficient.

Many attempts have already been made to obtain polypropylene multi-layer films with improved properties by incorporating additives into the covering layers, with a view to producing the desired properties. For example, it has previously been suggested to include an effective amount of a thermoplastic resin having a melting point above the melting point of the polypropylene (incompatible thermoplastic resin) or of an inorganic pigment into the covering layers. The inorganic pigments mentioned comprise aluminum oxide, silicon dioxide, titanium dioxide, a synthetic zeolite and the like, and also micro glass beads. However, all these films are unable to meet the actual requirements.

In a recent publication (European Patent Application No. 0 124 310), a non-sealable, biaxially oriented multi-layer film of propylene polymers is described, which is stated to have good slip and antiblocking properties and, at the same time, also a high transparency. This film comprises a base layer and at least one covering layer, the covering layers containing, as an additive for the improvement of properties, a finely divided inorganic pigment, for example, silicon dioxide, aluminum silicate, sodium-aluminum silicate and/or carbon black, in an amount such that the biaxially drawn multi-layer film does no longer show any turbidity worth mentioning. The average particle size of the pigment is specified as ranging from 0.2 to 5 $\mu$m. The shape (form) of the pigment particles is considered inessential.

The above-described polypropylene multi-layer film lacks, in particular, sufficient antistatic properties and scratch resistance — not to mention its slip and antiblocking values which still leave much to be desired. Just as all the other presently known non-sealable, oriented multi-layer films of propylene polymers, this film cannot be subjected to a corona treatment on both surfaces, since by this treatment the antiblocking behavior would be reduced to such an extent that blocking (sticking) of the film on the film roll would occur. Frequently, such sticking of superimposed film surfaces does not only give rise to elongation and tearing of the film, but can even prevent unwinding from the roll.

Moreover, sealable, biaxially oriented multilayer films of propylene polymers formed of two or three layers have also been disclosed, which contain one or several additives in their sealing layers to obtain good slip properties and, in particular, good machine runability in high-speed packaging machines, which is the most important property. These films, which are not the subject matter of the present invention, constitute a specific group of films and are intended for purposes which are completely different from those, for which nonsealable, oriented multi-layer films are used.

DISCLOSURE OF THE INVENTION

It is an object of the present invention to provide a non-sealable, biaxially oriented multi-layer film having good slip properties, and, in particular, good antiblocking properties, good optical properties (i.e. a very slight turbidity and a high transparency), good antistatic properties and a high scratch-resistance.

It is another object of the invention to provide a film, as above, in which the above properties remain unaffected when the film is subjected to a single- or double-sided corona treatment, which is particularly carried out to attain an improved printability and a better adhesion of adhesives and the like.

It is still another object of the invention to provide a process for the production of the abovedescribed film.

These objects are achieved by a non-sealable, biaxially oriented multi-layer film, comprising: (a) a polypropylene homopolymer base layer, and (b) at least one covering layer positioned over the base layer, the covering layer comprising on a total weight basis: (1) from about 0.2% to about 1.0% by weight of an aliphatic amine, (2) from about 0.2% to about 1.0% by weight of a polydialkylsiloxane, (3) from about 0.1% to about 1.0% by weight of a platelet-shaped inorganic pigment, and (4) the balance being a propylene homopolymer, wherein the platelets of the pigment are disposed substantially parallel to a surface of the covering layer.

The objects of the invention are also achieved by a process for producing the film, which includes the steps of: coextruding through a flat sheet die a plurality of melts corresponding to the base layer and at least one covering layer, cooling the coextruded film to a solidification temperature, biaxially draw orienting the solidified film, and heat setting the drawn film.

DETAILED DESCRIPTION OF THE PREFERRED EMBODIMENTS

In the film according to the present invention, both the base layer and the covering layers thus comprise a propylene homopolymer. The base layer is coated on one or both sides. If only one covering layer is present, the latter contains the indicated combination of additives. If two covering layers are present, at least one of these contains the indicated combination of additives. The other covering layer may be free from additives for the improvement of properties or may contain such additives. As far as the makeup of the multi-layer film of the present invention is concerned, the embodiment comprising a base layer and two covering layers is preferred. Preferably, both covering layers contain the combination of additives which is to be employed according to the present invention.

The propylene homopolymer which is used according to the present invention to form the base layer and the covering layers, preferably comprises an isotactic polypropylene. Preferred isotactic polypropylenes are those, in which the n-heptane-soluble amount is not more than about 15% by weight, preferably not more than about 8% by weight (the n-heptane-soluble amount of isotactic polypropylenes is normally in the range of from 2 to 10% by weight), the melting point is at least about 150° C. (it usually ranges from 155° to 170° C.) and the melt index (according to DIN 53 735) ranges from about 0.5 to about 8 g/10 min., preferably from about 1.5 to about 4 g/10 min., at 230° C. and under a load of 21.18 N. The propylene homopolymer of the covering layers has a melt index which is somewhat higher, preferably by 0.5 to 1 g/10 min., than the melt index of the base layer.

As component (1) of the combination of additives provided according to the present invention, tertiary aliphatic amines are advantageously used, which contain a (straight chain) alkyl radical which has from 10 to 20 carbon atoms, preferably from 12 to 18 carbon atoms and optionally, from one to three double bonds. The particularly preferred tertiary aliphatic amines are those which contain the above-indicated alkyl radical and two hydroxy-($C_2$ to $C_4$)-alkyl radicals. Preferred representatives of these are the N,N-bis-(2-hydroxyethyl)alkylamines containing a $C_{10}$ to $C_{20}$, preferably a $C_{12}$ to $C_{18}$, alkyl radical. The amount of component (1) advantageously ranges from about 0.2 to about 1.0 % by weight, preferably from about 0.4 to about 0.7% by weight, based on the layer.

Component (2) of the combination of additives provided according to the present invention comprises a polydialkylsiloxane, preferably a polydi-($C_1$ to $C_4$)-alkylsiloxane, polydimethylsiloxane being particularly preferred. The polydialkylsiloxane has a viscosity of from about 1,000 to about 100,000 $mm^2/s$ at 25° C., preferably about about 5,000 to 50,000 $mm^2/s$ at 25° C. The amount of component (2) ranges from about 0.2 to about 1.0 % by weight, and preferably from about 0.4 to about 0.7 % by weight, based on the layer. Component (3) of the combination of additives provided according to the present invention comprises a platelet-shaped inorganic pigment. The so-called "aspect ratio" of the platelets, which refers to the ratio surface: thickness (value of particle geometry), is in the range of from about 2 to about 20, preferably from about 4 to about 10. The average particle size ranges from about 0.1 to about 4 $\mu m$, preferably from about 0.2 to about 1 $\mu mm$ the largest particle being <20 $\mu m$ and the smallest particle >0.01 $\mu m$. According to the invention, inorganic pigments are thus used, which form a lamellar structure (a layer lattice). Silicates and carbonates are preferred. The carbonates usually comprise alkaline-earth metal carbonates, if appropriate with hydrate water, the calcium carbonates such as hydrotalcite and the magnesium carbonates being preferred (other metals, if at all present, are only contained in negligible amounts in the carbonates). Suitable silicates having a lamellar structure comprise alkali metal or alkaline-earth metal silicates such as anorthite and apophyllite, aluminum silicates (which may also contain alkali metals and/or alkaline-earth metals) such as kaolinite, montmorillonite, pyrophyllite and mica types, for example, muscovite and margarite, and magnesium silicates such as antigorite (lamellar serpentine), hectorite and talc. Aluminum silicates are preferred.

According to the present invention, the platelets of the inorganic pigment are disposed in parallel with the surface of the layer.

The pigment platelets which are uniformly distributed in the propylene homopolymer align substantially horizontally with respect to the plane of the film, particularly during the biaxial orientation, and are thus present in the indicated parallel position in the final film.

The amount of component (3) advantageously ranges from about 0.2 to 1.0% by weight and preferably from about 0.2 to about 0.6% by weight, based on the layer.

The thickness of the multi-layer film of the present invention may vary within wide limits and depends, in particular, on the intended use of the film. The film is from about 8 to about 50 $\mu m$, preferably from about 12 to about 40 $\mu m$, thick (total thickness), the thickness of one covering layer ranges from about 0.1 to about 2 $\mu m$, preferably from about 0.5 to about 1 $\mu m$.

The multi-layer film of the present invention is biaxially oriented (draw oriented), the longitudinal draw ratio preferably being from about 4:1 to about 7:1 and the transverse draw ratio preferably from about 7:1 to about 10:1.

For the production of the multi-layer films of propylene polymers according to the present invention, any of the processes known per se may be used. As is known, the mixtures (molding compounds) corresponding to the layers are first prepared by mixing the individual components in a mixer. It goes without saying that, in the preparation of the mixtures containing the combination of additives, the individual additives are properly mixed (incorporated) into the propylene homopolymer, such that they are present in a uniformly distributed form. The multi-layer films may be produced by coextrusion, followed by draw orientation; by subsequent coating of a draw oriented film (base film); or by coating an unoriented film, followed by draw orientation.

The multi-layer film of the invention is preferably produced according to the coextrusion process. In this process, the melts corresponding to the layers of the film are coextruded through a flat sheet die, the coextruded film is cooled and thereby solidified, the solidified film is biaxially draw oriented, preferably four to seven times in the longitudinal direction and preferably seven to ten times in the transverse direction, and the biaxially draw oriented film is heat set. First of all, the polymers (the mixtures) corresponding to the base layer and to the covering layer or covering layers, are liquefied and compressed in extruders. Then the melts are simultaneously extruded through a flat sheet die (slot die) and the extruded multi-layer film is cooled and solidified on one or several rolls maintained at a temperature of from about 30° C. to about 50° C. by cooling. The film thus obtained is longitudinally drawn at a temperature which is below the melting point of the polymer used. Longitudinal drawing is preferably carried out at a film temperature of from about 120° C. to about 140° C. Transverse drawing is preferably carried out at a draw temperature of from about 160° C. to about 180° C. Biaxial drawing can be carried out simultaneously or successively. It is preferably performed successively, namely, first longitudinally and then transversely. Longitudinal drawing is appropriately carried out with the aid of two rolls rotating at different speeds corresponding to the desired stretching ratio and transverse drawing with the aid of an appropriate clip tenter. For heat-setting (post heating) the film is kept at a temperature of from about 150° C. to about 160° C. for about 0.5 to about 10 seconds.

The non-sealable, biaxially draw oriented multilayer film of the present invention may be subjected to a corona treatment to render it, in particular, readily printable and coatable (for example with adhesives). It is an unexpected result that the film according to the present invention containing the specified combination of additives in its covering layers, can be subjected to a corona treatment, without thereby adversely influencing any of its desirable properties. The result achieved by the present invention is all the more surprising, since it has been pointed out in the literature and confirmed by experiments of the applicants that the slip and antiblocking behavior of polypropylene films is normally considerably impaired by a corona treatment.

In the corona treatment of the film, which can be carried out according to any of the known methods, the film is appropriately passed through a gap between two conductor elements serving as electrodes, while a voltage, usually an a.c. voltage (about 10,000 V and 10,000 cps) which is high enough to effect spray or corona discharges, is applied between the electrodes. By the corona treatment, a surface tension of about 38 mN/m is produced.

The non-sealable, biaxially oriented multi-layer film of propylene polymers according to the present invention has many uses due to its excellent characteristic features and the possibility of carrying out a corona treatment without impairing these characteristic features. It is suited for technical applications and packaging purposes. Preferably, the film of the invention is used as a laminating film, an interleaving film, a bag film, a base film for adhesive tapes or as a metallizable film or transfer metallizing film. In the use of the film according to the invention as a transfer metallizing film, it has unexpectedly been found that the extremely objectionable "Lichtenberg figures", which are normally produced by spark discharges during vapor depositing of the metal layer, do not occur.

The invention will now be explained in detail with reference to examples.

EXAMPLES AND COMPARATIVE EXAMPLES

With the aid of a coextrusion process, 1 mm thick films formed of one, two or three layers were, in each case, extruded through a slot die having a width of 280 mm and a gap height of 1.8 mm, at an extrusion temperature of 260° C. and a throughput of 70 kg/h, the base layers of the films comprising, in each case, an isotactic polypropylene with an n-heptane-soluble amount of 4.5% by weight, a melting point of 165° C. and a melt flow index of 2 g/10 min at 230° C. and under a load of 21.18 N (DIN 53 735) and the covering layer or covering layers having different compositions, in each case. After travelling through a 20 mm long air gap, the coextruded films were chilled on a chill roll at a temperature of 30° C., which had a diameter of 600 mm and rotated at a circumferential speed of 4.5 m/min. Thereafter, the films were passed from the chill roll to a three-high roll arrangement which also had a temperature of 30° C. and a circumferential speed of 4.5 m/min and, after heating to 130° C., were longitudinally drawn by a factor of 5 by a further three-high roll arrangement. They were then drawn 10 times in the transverse direction at 175° C. Heat setting was carried out at 160° C., over a period of 5 seconds and was optionally followed by a corona treatment of the films on one or both sides. The base layers of the resulting films were, in each case, 19 μm thick. Each of the covering layers had a thickness in the range of from 0.5 to 0.8 μm.

EXAMPLE 1

The film was formed of a so-called "ABA-arrangement", i.e. the two covering layers (A) were identical and differed in composition from the base layer (B).

Base layer: Comprising an isotactic polypropylene, as indicated above.

Covering layers: Comprising, as the main constituent, an isotactic polypropylene with an n-heptane-soluble amount of 4.5% by weight, a melting point of 165° C. and a melt flow index of 3 g/10 min, and 0.5% by weight of N,N-bis-(2-hydroxy-ethyl)-C12 to C18-alkylamine, 0.7% by weight of polydimethyl-siloxane having a viscosity of 30,000 mm$_2$s at 25° C. and 0.4% by weight of a platelet-shaped aluminum silicate having an aspect ratio of 6; the average particle size (the average particle diameter) was 0.55 μm, covering a range of from <10 μm to >0.01 μm (percentages by weight based on the total weight of the layer).

EXAMPLE 2

Example 1 was repeated; the film was corona-treated on one side. The intensity of the surface treatment was 38 mN/m.

EXAMPLE 3

Example 1 was repeated; the film was corona-treated on both sides. The intensity of the surface treatment was 38 mN/m on each side (in any of the corona treatments mentioned below, the intensity of treatment was also invariably 38 mN/m). Example 4

The film was formed of a so-called "AB-arrangement", i.e. it comprised a base layer (B) and a covering layer (A); accordingly, the base layer is provided with a covering layer on one side only.

Base layer: Comprising the isotactic polypropylene indicated in Example 1.

Covering layer: Comprising the components indicated in Example 1 for the covering layers.

EXAMPLE 5

Example 4 was repeated; the film was corona-treated on the (free) surface of the base layer.

EXAMPLE 6

Example 4 was repeated; the film was corona-treated on the surface of the covering layer.

EXAMPLE 7

Example 4 was repeated; the film was corona-treated on both sides.

EXAMPLE 8

The film was formed of a so-called "ABC-arrangement", i.e. it comprised three layers of different compositions, namely the base layer (B) and two covering layers (A) and (C).

Base layer: Comprising the isotactic polypropylene indicated in Example 1.

Covering layer A: Comprising the components indicated in Example 1 for the covering layers.

Covering layer C: Comprising the same isotactic polypropylene as the covering layer (A) and containing, from the combination of additives used in covering layer (A), only 0.4% by weight of aluminum silicate, i.e. neither polydimethylsiloxane nor amine were present.

EXAMPLE 9

Example 8 was repeated; the film was corona-treated on the covering layer according to the invention, i.e. on covering layer A.

EXAMPLE 10

Example 8 was repeated; the film was corona-treated on covering layer C.

EXAMPLE 11

Example 8 was repeated; the film was corona-treated on both sides.

COMPARATIVE EXAMPLE 1

The film only comprised the base layer of Example 1.

COMPARATIVE EXAMPLE 2

Comparative Example 1 was repeated; the film was corona-treated on one side. The intensity of the surface treatment was 38 mN/m.

COMPARATIVE EXAMPLE 3

Comparative Example 1 was repeated; the film was corona-treated on both sides. The intensity of the surface treatment was 38 mN/m on each side (in any of the corona treatments mentioned below, the intensity was also invariably 38 mN/m).

COMPARATIVE EXAMPLE 4

The film only comprised the base layer of Example 1; as distinguished from Comparative Example 1, the layer contained additives, namely 0.4% by weight of the indicated aluminum silicate, 0.2% by weight of stearic acid amide and 0.2% by weight of the indicated $C_{12}$ to $C_{18}$-alkylamine (percentages by weight based on the layer).

COMPARATIVE EXAMPLE 5

Comparative Example 4 was repeated; the film was corona-treated on one side.

COMPARATIVE EXAMPLE 6

Comparative Example 4 was repeated; the film was corona-treated on both sides.

COMPARATIVE EXAMPLE 7

The film was formed of an ABA-arrangement, as in Example 1.
Base layer: Corresponding to the base layer of Example 1, with the difference that it additionally contained additives, namely 0.2% by weight of stearic acid amide and 0.2% by weight of the indicated $C_{12}$ to $C_{18}$-alkylamine.
Covering layers: Corresponding to the covering layers of Example 1, with the difference that they only contained 0.4% by weight of aluminum silicate and neither polydimethylsiloxane nor amine (cf. covering layer C of Example 8).

COMPARATIVE EXAMPLE 8

Comparative Example 7 was repeated; the film was corona-treated on one side.

COMPARATIVE EXAMPLE 9

Comparative Example 7 was repeated; the film was corona-treated on both sides.

COMPARATIVE EXAMPLE 10

The film was formed of an ABA-arrangement, as in Example 1.
Base layer: Corresponding to the base layer of Example 1.
Covering layers: Corresponding to the covering layers of Comparative Example 7.

COMPARATIVE EXAMPLE 11

Comparative Example 10 was repeated; the film was corona-treated on one side.

COMPARATIVE EXAMPLE 12

Comparative Example 10 was repeated; the film was corona-treated on both sides.

The films of the examples and comparative examples were used to determine the anti-blocking properties, slip properties, optical properties (gloss and turbidity), anti-static properties and scratch resistance.

The anti-blocking property was determined by evaluating the unwinding behavior of a film roll in a type U 625 cutting machine of Messrs. Kampf (Federal Republic of Germany), operating at 500 m/min.

The slip property was determined according to DIN 53 375.

For the determination of gloss, DIN 67 530 was followed using a type RB reflectometer of Messrs. Dr. Lange (Federal Republic of Germany).

The turbidity was determined according to ASTM-D 1003-52, using a 1° slit stop instead of a 4° aperture stop and measuring the turbidity on four superimposed film layers (four layers were chosen since, in this manner, the optimum measuring range of the apparatus was utilized).

The antistatic property was determined by an ash test. For this purpose, the film was statically charged by rubbing three times in one direction with a woolen cloth. The test result is considered negative, if cigarette ash is attracted by the charged film from a distance of about 3 cm.

The scratch resistance was determined according to DIN 53 754. An abrasion tester 11 671 of Messrs. Frank (Federal Republic of Germany) was used, employing CALIBRASE® CS-10F abrading discs of Messrs. Teledyne (U.S.A.), loaded at 250 g. Scratch resistance or sensitivity to scratching refers to the increase in turbidity of the scratched film compared to the turbidity of the original film, after 50 revolutions of the turntable.

In the following table, the test results are compiled.

TABLE

| Example/ Comparative Example (CE) No. | Anti- Blocking Behavior | Slip Behavior | Optical Properties | Anti- static Properties | Scratch Resistance |
| --- | --- | --- | --- | --- | --- |
| 1 | ++ | ++ | ++ | ++ | ++ |
| 2 | ++ | ++ | ++ | ++ | ++ |
| 3 | ++ | ++ | ++ | ++ | ++ |
| 4 | ++ | ++ | ++ | ++ | ++ |
| 5 | ++ | ++ | ++ | ++ | ++ |
| 6 | ++ | ++ | ++ | ++ | ++ |
| 7 | ++ | ++ | ++ | ++ | ++ |
| 8 | ++ | ++ | ++ | ++ | ++ |
| 9 | ++ | ++ | ++ | ++ | ++ |
| 10 | ++ | ++ | ++ | ++ | ++ |
| 11 | ++ | ++ | ++ | ++ | ++ |
| CE | | | | | |
| 1 | -- | -- | ++ | -- | -- |
| 2 | -- | -- | ++ | -- | -- |

TABLE-continued

| Example/ Comparative Example (CE) No. | Anti- Blocking Behavior | Slip Behavior | Optical Properties | Antistatic Properties | Scratch Resistance |
|---|---|---|---|---|---|
| 3 | -- | -- | ++ | -- | -- |
| 4 | ++ | +- | -- | ++ | +- |
| 5 | ++ | +- | -- | ++ | +- |
| 6 | -- | +- | -- | ++ | +- |
| 7 | ++ | +- | +- | +- | +- |
| 8 | ++ | +- | +- | +- | +- |
| 9 | -- | +- | +- | +- | +- |
| 10 | ++ | +- | ++ | -- | +- |
| 11 | ++ | +- | ++ | -- | +- |
| 12 | -- | +- | ++ | -- | +- |

++ very good
+- moderate
-- poor

In the non-sealable multi-layer films of propylene polymers according to the present invention, all the important properties required for films of this type are very good, as shown by the test results. The films are particularly distinguished by the fact that they can be corona-treated and, nevertheless, keep their very good anti-blocking and slip behavior and thus remain excellently convertible.

What is claimed is:

1. A non-sealable, biaxially oriented multi-layer film, comprising:
   (a) a polypropylene homopolymer base layer; and
   (b) at least one covering layer positioned over said base layer, said covering layer comprising on a total weight basis:
   (1) from about 0.2% to about 1.0% by weight of an aliphatic amine;
   (2) from about 0.2% to about 1.0% by weight of a polydialkylsiloxane;
   (3) from about 0.1% to about 1.0% by weight of a platelet-shaped inorganic pigment comprising a platelet-shaped calcium carbonate or magnesium carbonate or a platelet-shaped aluminum silicate; and
   (4) the balance being a propylene homopolymer;
   wherein the platelets of said pigment are disposed substantially parallel to a surface of said covering layer.

2. A film as claimed in claim 1, wherein the amount of said polydialkylsiloxane is from about 0.4% to about 0.7% by weight.

3. A film as claimed in claim 1, wherein said propylene homopolymer base layer comprises an isotactic polypropylene with an n-heptane-soluble amount of not more than about 15% by weight, a melting point of at least about 150° C. and a melt index of from about 0.5 g to about 8 g/10 min at 230° C. and under a load of 21.18 N.

4. A film as claimed in claim 1, wherein the melt flow index of said propylene homopolymer in said cover layer is from about 1 to about 9 g/10 min at 230° C. and under a load of 21.18 N.

5. A film as claimed in claim 1, wherein said aliphatic amine comprises an N,N-bis-(hydroxy-C2 to C4-alkyl)-$C_{12}$ to $C_{18}$-alkylamine.

6. A film as claimed in claim 1, wherein said polydialkylsiloxane comprises a polydi(C1 to C4) alkylsiloxane having a viscosity of from about 1,000 to about 100,000 mm2/s at 25° C.

7. A film as claimed in claim 1, wherein the platelets have an aspect ratio of from about 2 to about 20 and wherein the average particle size is from about 0.1 to about 4 μm, the largest particle being less than about 20 μm and the smallest particle being greater than about 0.01 m.

8. A film as claimed in claim 7, wherein said aspect ratio is from about 4 to about 10.

9. A film as claimed in claim 1, said film comprising a base layer and two covering layers.

10. A film as claimed in claim 1, wherein said film includes two covering layers, and wherein both said covering layers contain said aliphatic amine, said polydialkylsiloxane and said platelet-shaped inorganic pigment.

11. A film as claimed in claim 1, wherein said film is from about 8 to about 50 /um thick, the thickness of one said covering layer being from about 0.1 to about 2 μm.

12. A laminating film formed from the multilayer film as claimed in claim 1.

13. An interleaving film formed from the multilayer film as claimed in claim 1.

14. A bag film formed from the multi-layer film as claimed in claim 1.

15. A base film for adhesive tapes formed from the multi-layer film as claimed in claim 1.

16. A metallizable film formed from the multilayer film as claimed in claim 1.

17. A transfer metallizable film formed from the multi-layer film as claimed in claim 1.

* * * * *